(12) United States Patent
Havard et al.

(10) Patent No.: US 7,158,286 B2
(45) Date of Patent: Jan. 2, 2007

(54) FIBER OPTIC TRANSMISSION SYSTEM USING RAMAN EFFECT AMPLIFICATION

(75) Inventors: Vincent Havard, Choisy le Roi (FR); François Boubal, Viry Chatillon (FR)

(73) Assignee: Alcatel, Paris (FR)

( * ) Notice: Subject to any disclaimer, the term of this patent is extended or adjusted under 35 U.S.C. 154(b) by 123 days.

(21) Appl. No.: 10/965,028

(22) Filed: Oct. 15, 2004

(65) Prior Publication Data
US 2005/0168802 A1  Aug. 4, 2005

(30) Foreign Application Priority Data
Oct. 17, 2003 (FR) .................................. 03 12132

(51) Int. Cl.
*H01S 3/00* (2006.01)

(52) U.S. Cl. ..................................... 359/334
(58) Field of Classification Search ................ 359/334, 359/341.33
See application file for complete search history.

(56) References Cited

U.S. PATENT DOCUMENTS

| | | | |
|---|---|---|---|
| 5,691,832 A * | 11/1997 | Liedenbaum et al. ......... | 398/43 |
| 5,917,969 A | 6/1999 | Gavrilovic et al. ............ | 385/15 |
| 6,417,958 B1 * | 7/2002 | Du et al. ..................... | 359/334 |
| 6,456,426 B1 | 9/2002 | Bolshtyansky et al. ..... | 359/334 |
| 6,606,337 B1 * | 8/2003 | King ............................ | 372/70 |
| 6,646,786 B1 * | 11/2003 | Meli et al. ................... | 359/334 |
| 6,748,136 B1 * | 6/2004 | Headley et al. ............... | 385/27 |
| 6,801,308 B1 * | 10/2004 | Achtenhagen et al. ..... | 356/73.1 |
| 6,844,961 B1 * | 1/2005 | Odate et al. ................. | 359/334 |
| 2003/0039438 A1 * | 2/2003 | Gertsvolf et al. ............. | 385/27 |
| 2003/0072064 A1 | 4/2003 | Ohta ........................... | 385/27 |
| 2004/0080809 A1 * | 4/2004 | Mermelstein ............... | 359/333 |
| 2004/0201881 A1 * | 10/2004 | Martinelli et al. .......... | 359/334 |

OTHER PUBLICATIONS

Eiselet et al. Raman Induced Crosstalk with PRBS Modulation. OFC 2003. Mar. 23-28, 2003. pp. 334-335.*

* cited by examiner

*Primary Examiner*—Deandra M. Hughes
(74) *Attorney, Agent, or Firm*—Sughrue Mion, PLLC

(57) ABSTRACT

An optical transmission system uses as its transmission medium a fiber having chromatic dispersion. A sender emits an optical signal to be transmitted into the fiber. A sender emits into the transmission medium pumping light constituting a first pump adapted to pump the optical signal by the Raman effect and pumping light constituting a second pump adapted to pump the first pumping light by the Raman effect. The first pump and the second pump are amplitude modulated and the envelopes of the first pump and the second pump are decorrelated in time. This decorrelation limits the efficiency of the Raman pumping of the first light by the second light on emission. Varying the decorrelation in time between the pump envelopes varies the region of the transmission system in which the signals are amplified.

9 Claims, 2 Drawing Sheets

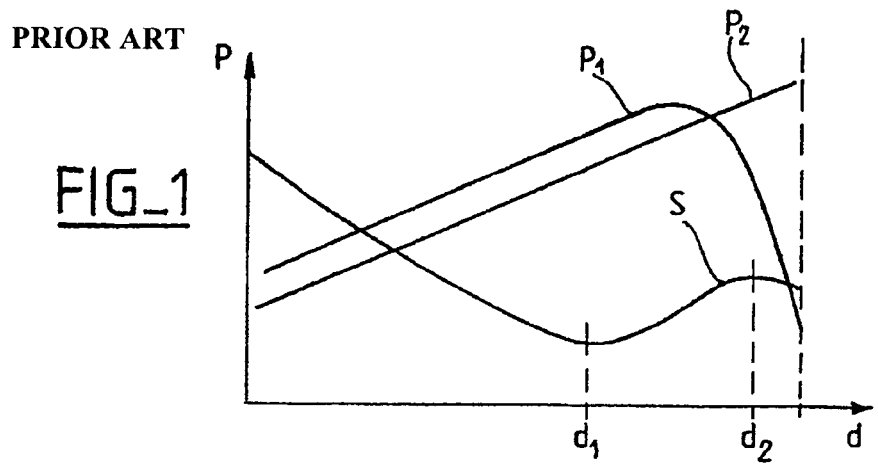
FIG_1 PRIOR ART
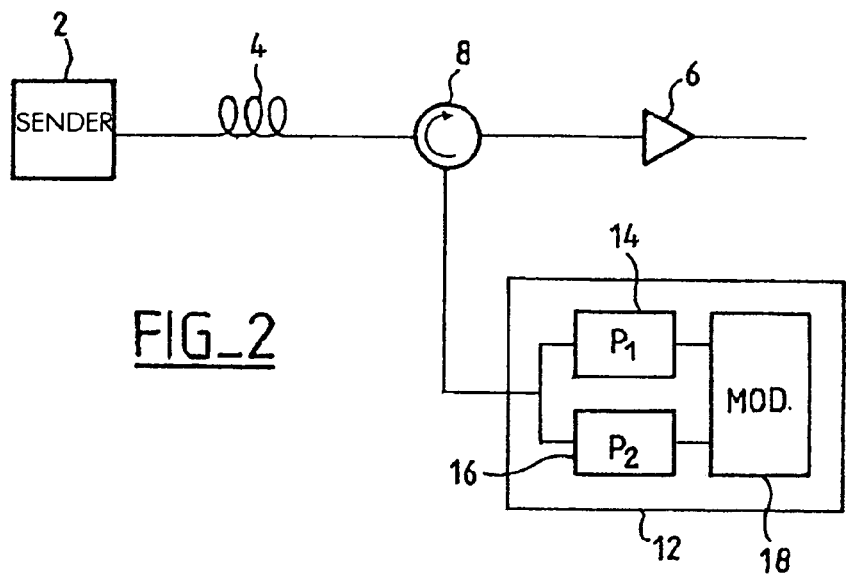
FIG_2
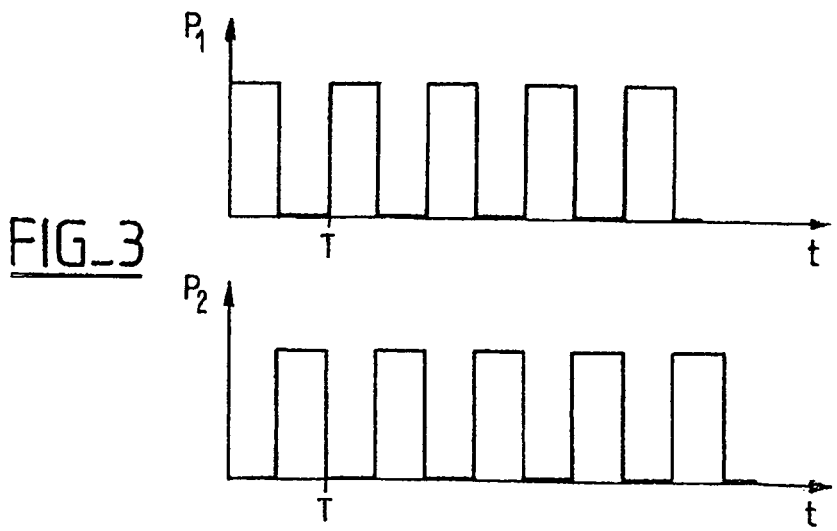
FIG_3

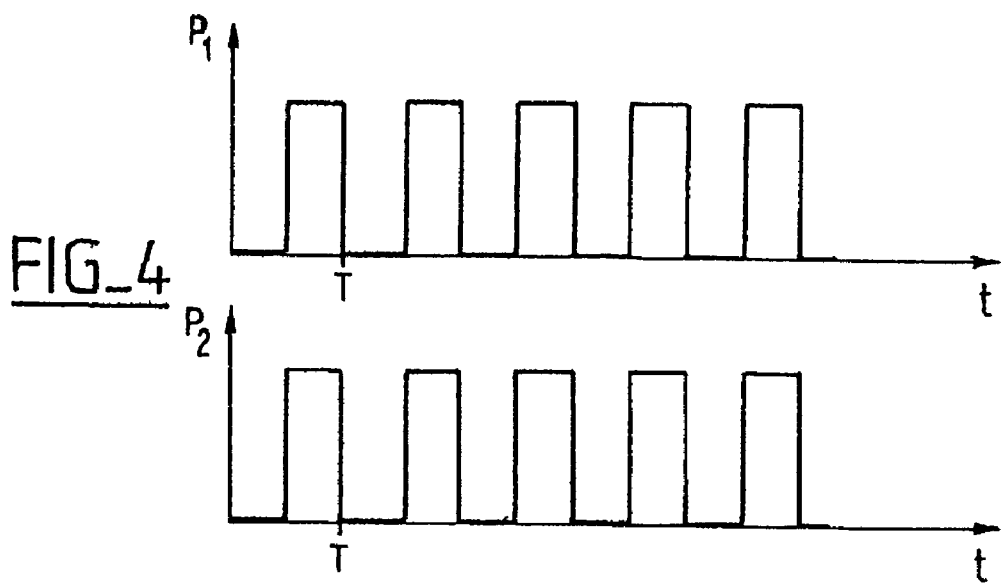
FIG_4
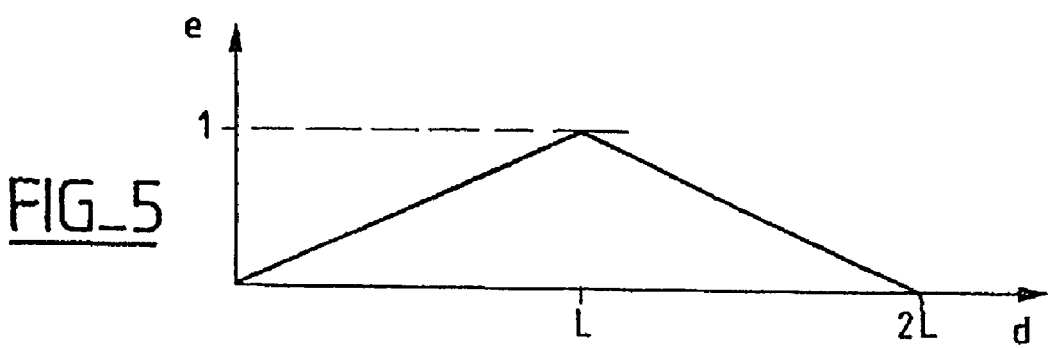
FIG_5
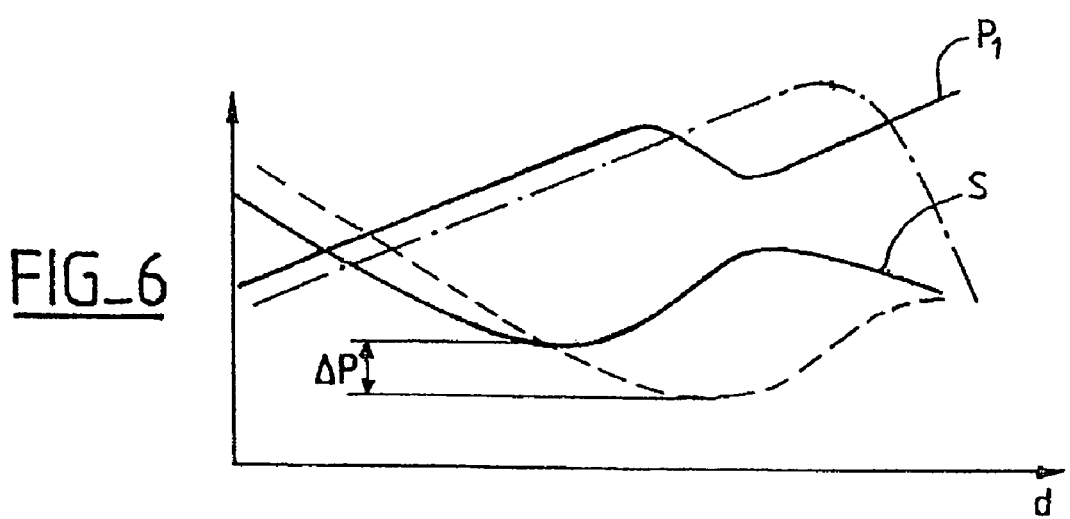
FIG_6

FIBER OPTIC TRANSMISSION SYSTEM USING RAMAN EFFECT AMPLIFICATION

CROSS-REFERENCE TO RELATED APPLICATIONS

This application is based on French Patent Application No. 03 12 132 filed Oct. 17, 2003, the disclosure of which is hereby incorporated by reference thereto in its entirety, and the priority of which is hereby claimed under 35 U.S.C. §119.

BACKGROUND OF THE INVENTION

1. Field of the Invention

The field of the present invention is that of optical transmission systems and more precisely that of the amplification of signals in optical transmission systems.

2. Description of the Prior Art

A fiber optic transmission system typically comprises a sender that injects signals to be transmitted into an optical fiber and a receiver that receives the signals after propagation in the fiber. Propagation in the fiber leads to attenuation of the signal. Repeaters may be provided along the fiber to amplify or format the signals.

Using the Raman effect to amplify the transmitted signals has been suggested. Pumping light is injected into the fiber. The power of the pumping light is transferred to the signal by the Raman effect along the fiber. The wavelength of the pumping light is chosen so that the maximum Raman gain occurs near the wavelength of the signal to be amplified. The pumping efficiency is a function of the power of the pumping light and the power of the signal to be pumped. This solution is described in "Nonlinear Fiber Optics", Govind P. Agrawal, Ed. 2-Chap. 8, for example.

U.S. Pat. No. 6,181,464 (Tycom), entitled "Low noise Raman amplifier employing bidirectional pumping and an optical transmission system incorporating the same", H. D. Kidorf, proposes simultaneously injecting into the transmission system first pumping light (first pump) $P_1$ at a first pump wavelength $\lambda_1$ and second pumping light (second pump $P_2$) at a second pump wavelength $\lambda_2$. The wavelength of the first pump is chosen to pump the signal by the Raman effect and the wavelength of the second pump is chosen to pump the first pump by the Raman effect. FIG. 1 is a graph of the power of the signal S and the pumps $P_1$ and $P_2$ in a system of the above kind in the case of contrapropagating pumps. The power is plotted on the ordinate axis and the distance along the optical fiber is plotted on the abscissa axis. The signal S is injected at one end of the fiber—the left-hand end in the figure—and the pumps are injected at the other end of the fiber—the right-hand end in the figure. The curve marked S in the FIG. 1 graph is the curve of the power of the signal; as the figure shows, the power of the signal is at a maximum on injection and decreases over a first portion of the fiber, as far as a distance $d_1$, because of attenuation in the fiber. The power of the signal is at a minimum at the distance $d_1$. Between the distances $d_1$ and $d_2$, the power of the signal increases because of the pumping of the signal by the pump $P_1$. Beyond the distance $d_2$, the power of the signal decreases again, the power of the pump $P_1$ being insufficient for the pumping to compensate the attenuation of the signal.

At the other end of the fiber, the first pump is injected at a lower power than the second pump. In the pump propagation direction—from right to left in the FIG. 1 diagrams— the power of the second pump decreases because of attenuation and because of the transfer of power to the first pump by the Raman effect. In the pump propagation direction, the power of the first pump initially increases, the effects of attenuation being compensated by the pumping of the first pump by the second pump. The power of the first pump thereafter decreases, because of the transfer of power from the first pump to the signal by the Raman effect and because of attenuation by the fiber.

The above system has the following drawbacks. The pumping power injected into the fiber is limited by Rayleigh backscattering and limits the injection of power from the first pump. For a given fiber, it is not possible simply to choose the region in the fiber in which the signal will be amplified or to modify this region after the system has been designed.

There is therefore a need for a transmission system in which distributed amplification may be modified and in particular a system enabling selection of the region of the fiber in which the distributed amplification takes place.

SUMMARY OF THE INVENTION

One embodiment of the invention therefore proposes an optical transmission system comprising a transmission medium having chromatic dispersion, means for emitting into the transmission medium an optical signal to be transmitted, means for emitting into the transmission medium a first pump at a wavelength adapted to pump the optical signal by the Raman effect, and means for emitting into the transmission medium a second pump at a wavelength adapted to pump the first pump by the Raman effect, the means for emitting the pumps being adapted to emit amplitude-modulated first and second pumps with a decorrelation in time between the envelopes of the pumps.

According to one feature of the invention, the means for emitting the pumps are adapted to emit first and second pumps amplitude modulated with the same modulation waveform.

According to one feature of the invention, the means for emitting the pumps are adapted to vary the decorrelation in time between the envelopes of the first and second pumps.

According to one feature of the invention, the means for emitting the pumps are adapted to emit the first and second pumps without the envelopes of the pumps overlapping.

According to one feature of the invention, the means for emitting the optical signal and the means for emitting the pumps are adapted to emit into the transmission medium pumps contrapropagating with respect to the optical signal.

The invention also proposes a method for the Raman amplification of an optical signal in a dispersive propagation medium, the method comprising the emission into the propagation medium of a first pump at a wavelength adapted to pumping the optical signal by the Raman effect and a second pump adapted to pump the first pump by the Raman effect, the first and second pumps being amplitude modulated with a decorrelation in time between the envelopes of the pumps.

According to one feature of the invention, the first and second pumps are amplitude modulated with the same modulation waveform.

According to one feature of the invention, the method comprises a step of varying the decorrelation in time between the envelopes of the first and second pumps during propagation.

According to one feature of the invention, emission of the pumps is effected in a direction opposite to that of the signals.

Other features and advantages of the invention will become apparent on reading the following description of a preferred embodiment of the invention, which is given by way of example only and with reference to the appended drawings.

BRIEF DESCRIPTION OF THE DRAWINGS

FIG. 1 is a graph of the power in a prior art transmission system.

FIG. 2 is a diagrammatic representation of one embodiment of a transmission system of the invention.

FIG. 3 is a graph of the power of the pumps in the vicinity of the injection point.

FIG. 4 is a graph of the power of the pumps at a point along the transmission system.

FIG. 5 is a graph of the efficiency of the interaction between the pumps as a function of distance.

FIG. 6 is a graph of the power in the FIG. 2 system.

DETAILED DESCRIPTION OF THE PREFERRED EMBODIMENT

The invention proposes, in a transmission system employing distributed amplification, using a plurality of pumps to amplitude modulate the pumping light and decorrelating the envelopes of the pumps in time on injection into the fiber. The modulation and the decorrelation limit mutual pumping of the pumps on injection into the fiber. The pumps having different wavelengths, because of chromatic dispersion in the fiber the original decorrelation of the pumps on injection is not preserved as the pumps propagate along the fiber. It is therefore possible to adapt the region of the fiber in which the distributed amplification is maximum as a function of the chromatic dispersion of the fiber and the pump wavelengths.

FIG. 2 is a diagrammatic representation of one embodiment of a transmission system of the invention, showing by way of example a system without repeaters and using contrapropagative pumping. The figure shows an emitter 2 injecting signals to be transmitted into a fiber 4 and, by way of example, an amplifier 6 receiving the signals after propagating in the fiber; these signals may be wavelength division multiplexed (WDM) signals, as is known in the art. A circulator 8 is disposed on the fiber on the upstream side of the amplifier, this being merely one example of a system enabling pumping light to be injected into a fiber. A fiber section 10 connects the circulator 8 to the pump source 12. The latter comprises two sources 14 and 16 supplying pumping light at different wavelengths. These sources are amplitude-modulated by a modulator 18, which is adapted to apply amplitude modulation to the sources 14 and 16 in the manner described with reference to FIGS. 3 and 4. It is advantageous to be able to adjust one of the following parameters at the modulator 18: the frequency of the modulation signal, the waveform of the modulation signal, the depth of modulation, and the time shift between the modulation signals. Adjusting one or more of these parameters, either at the time of installation or during subsequent operation, adapts the pumping light source to the transmission system in order to overcome variations caused by aging of the transmission system components.

In the example shown in FIGS. 3 and 4, the two pumps are amplitude modulated with a square modulation waveform having a modulation depth of 100% and a duty cycle of 50%. In this example the modulation frequencies are identical. FIG. 3 shows diagrammatic graphs of the power as a function of time at the vicinity of the injection point. The power of the first pump is shown in the upper portion of the figure, and is amplitude modulated. The lower portion of the figure shows the power of the second pump. As shown in the figure, the two pumps are modulated at the some modulation frequency but are time shifted by one half-period. In other words, the envelopes of the light signals are decorrelated in time; alternatively, it could also be said that the signals controlling amplitude modulation are identical but out of phase. Because of this decorrelation, the light of the first pump does not "see" the light of the second pump, which limits the efficiency of pumping by the Raman effect; strictly speaking, in the absence of any overlap between the two pumps, there is no pumping of one pump by the other.

FIG. 4 shows graphs similar to those of FIG. 3, after propagation over a given distance L in the line fiber. The line fiber is subject to chromatic dispersion, as is known in the art. Because of this chromatic dispersion, the phase velocities of the pulses of the first and second pumps are different. The amplitudes of the first and second pumps have a phase difference that varies along the transmission system. FIG. 4 shows the amplitude of the pumps when propagation along the fiber has been sufficient for the pump signals to be "in phase", in other words for the correlation in time of the envelopes of the light signals to be at a maximum. The figure shows the normalized amplitudes and ignores the attenuation of the signals as a result of propagation or of the transfer of power between the pumps by the Raman effect.

FIG. 5 is a graph of the efficiency e of the interaction between the pumps. This efficiency is a measure of the overlap between the two pumps. It is zero in FIG. 3 for pumps with a phase difference of $\pi/2$—i.e. for pumps modulated with periodic amplitude modulation commands that are identical but with a phase difference of one half-period. The efficiency has a maximum value of 1 for superposed pumps. To enable adjustment of the amplification region over as large a range as possible, it is advantageous to be able to vary the overlap between the pumps in the range from 0 to 1. The value 0 avoids any transfer of power from the pumps on emission. The value 1 maximizes the transfer of power when the envelopes of the pumps are in phase.

The value of the interaction efficiency represented in the graph may be obtained by calculating the product of the envelopes of the light constituting the first and second pumps. The figure shows that the efficiency of interaction, for the FIG. 1 modulation, is zero at the origin. It has the value 1 at a distance L satisfying the equation:

$$T/2 = C(\lambda_1 - \lambda_2)L$$

where

C is the chromatic dispersion of the fiber in ps.(nm.km)$^{-1}$;

T is the period of the amplitude-modulation signal in ps;

$\lambda_1$ and $\lambda_2$ are the first and second pump wavelengths in nm.

The above equation simply indicates that the chromatic dispersion difference between the two pumps induces a phase difference between the two pumps that is equal to half the modulation period after a distance L in km. After the distance L, the efficiency of interaction decreases linearly until it reaches 0 again at a distance 2×L. The FIG. 5 graph shows the efficiency of the overlap and is not representative of variations in the maximum amplitude of the pumps because of attenuation in the fiber or mutual transfer of power between the pumps or transfer of power between the pumps and the signal or because the pumps are injected into the fiber at different powers.

It is clear from FIG. 5 that the region of the fiber in which the first pump is pumped by the second pump is shifted in terms of distance compared to the FIG. 1 solution: instead of the pumping of the second pump by the first pump occurring mostly in the vicinity of the sources, it occurs after the pumps have traveled along the fiber. The power peak of the first pump is shifted commensurately, as is the region of the fiber in which the signal is pumped. The example shown in the figure is representative of the simple situation of signals with a phase difference of $\pi/2$ and square waveform amplitude modulation of the pumps. Clearly the shape of the efficiency curve depends on the original decorrelation in time of the two pumps; in other words, adjusting the decorrelation in time of the two pumps on injection into the fiber shifts along the fiber the point of maximum overlap of the pumps and alters the region in which the signal is pumped by the first pump. It is also clear that the shape of the efficiency curve also depends on the waveform of the amplitude modulation applied to the two pumps; in the FIG. 5 example, the linear shape is a consequence of the square waveform of the amplitude modulation. For example, the application of sinusoidal modulation to the pumps would yield an interaction efficiency conforming to a $\sin^2$ function rather than a linear function; with this form of modulation, having zero slope at the origin, the interaction between the pumps increases more slowly after injection and the region of the fiber in which the second pump is pumped by the first pump is pushed even further back compared to the FIG. 5 example. Independently of the adjustment of the decorrelation in time between the two pumps, the region in which the pumping is effected may be shifted along the fiber by choosing the waveforms of the amplitude modulation of the pumps. The modulation proposed by way of example in FIGS. 3 and 4 has a modulation depth of 100%; clearly a lower modulation depth would have the consequence of a greater overlap of the pumps, all other things being equal. It is also clear that the pump waveforms could be different, rather than identical as in the proposed example.

The region of the fiber in which the first pump is pumped by the second pump also depends on the chromatic dispersion of the fiber and on the modulation frequency used. As the above example shows, the distance at which the pumps decorrelated in time overlap is proportional to the period of the amplitude modulation and inversely proportional to the product of the chromatic dispersion by the wavelength difference between the pumps. This wavelength difference between the pumps is constrained by the Raman-Stokes shift, and is around 100 nm. For the graded index fibers conventionally used in transmission systems, the chromatic dispersion in the range of wavelength used is typically around 17 ps.(nm.km)$^{-1}$. Thus the distance L may also be modified by varying the frequency of the signal amplitude modulating the pumps. Frequencies of the amplitude-modulation signal from 7 MHz to 15 MHz may typically be chosen. For these values, the distance L could vary from 20 km to 40 km, for example.

FIG. 6 is a diagrammatic graph of the powers in the FIG. 2 system plotted on a logarithmic scale. As in FIG. 1, the power is plotted on the ordinate axis and the distance along the optical fiber is plotted on the abscissa axis. The graph shows in chain-dotted line the power of the signal in the FIG. 1 system, for comparison purposes. The curve S shows the power of the signal in the FIG. 2 system. Note that the power injected into the fiber is lower than that needed in the prior art to achieve the same output power; this shows that the invention provides more efficient pumping. A power similar to that of the prior art could also be injected into the fiber, the proposed solution then providing propagation over a greater distance.

The graph also shows the curve Pi of the power of the first pump injected into the transmission system and, by way of comparison, the power of the first pump injected into the FIG. 1 transmission system; the powers represented are average powers. The graph shows that the first pump is injected into the FIG. 2 system with a power greater than that of the first pump in the FIG. 1 system. In fact, the limitation that is imposed by Rayleigh backscattering is a limitation on the instantaneous power of the pump P1, integrated along the fiber. In the FIG. 2 system, the powers of the first and second pumps are chosen to conform to this limitation.

Starting from the right-hand side of the figure, and in the pump propagation direction, the power of the first pump initially decreases because of attenuation. In this first region, the decorrelation in time between the two pumps is such that the Raman pumping by the second pump is insufficient to compensate the attenuation of the first pump. The power of the first pump increases thereafter, when the decorrelation in time between the two pumps has been reduced sufficiently for the transfer of power from the second pump to the first pump by the Raman effect at least to compensate the attenuation. Continuing in the direction of propagation of the pumps, the power of the first pump decreases again, because of the transfer of power from the first pump to the signals.

The curve S in FIG. 6 shows that the graph of the power of the signals has a shape similar to that of the FIG. 1 graph: the power initially decreases, because of the attenuation, before it increases, because of the Raman pumping, and then decreases again. However, compared to the FIG. 1 graph, the power in the FIG. 2 system decreases less, the signals being pumped sooner by the first pump in the FIG. 2 system. As a result of this, for a similar output power, there is an improvement in the signal to noise ratio, indicated by the arrow $\Delta P$ in FIG. 6.

Thus FIG. 6 shows that using pumps as proposed in FIG. 2 reduces the power of the signals injected into the transmission system and increases the signal to noise ratio in the transmission system and thereby increases the propagation distance of the signal for equivalent injected and received powers and for linear propagation conditions. Care is taken to preserve an equivalent integral signal power at the non-linear threshold limit.

Of course, the invention is not limited to the preferred embodiment described above. In particular, although FIG. 2 relates to the example of a system with two pumps, there may be more than two pumps. This may have the advantage of widening the band of the pump signals. For example, for signals in a range of wavelengths from 1550 nm to 1600 nm, two first pumps could be used with similar wavelengths of 1450 nm and 1470 nm to pump the signals. A second pump at a wavelength of around 1360 nm could then be used to pump the first two pumps.

The example of FIGS. 2 to 6 shows square waveform modulation with a phase difference of $\pi/2$. This choice of modulation waveform and time shift avoids interaction between the first pump and the second pump on injection. Other amplitude modulation waveforms may be chosen as a function of the required distributed amplification distribution; different modulations may be used for the two pumps. A phase difference between the two pumps other than the value of $\pi/2$ proposed by way of example may also be chosen. The effect of a change of phase shift, ceteris paribus, has the effect of shifting the FIG. 5 graph relative to the origin. A change of the amplitude modulation applied to the signals changes the shape of the FIG. 5 graph, which is no longer necessarily linear. Varying the frequency of the modulation signal has the effect of shifting the propagation distance needed for the initially out of phase pumps to be in phase.

In the examples, the invention is applied to a fiber optic transmission system. It is obvious that it also applies to an optical transmission system using a different form of dispersive transmission medium. The FIG. 2 example shows a transmission system with contrapropagating pumps. The invention may also be applied to a transmission system with copropagating pumps. In the FIG. 2 example, two sources 14 and 16 modulated by a modulator 18 are used; other embodiments of the hardware may be used to generate the pump light and amplitude modulate it. For example, a single modulator could be used to modulate the multiplexed pumps and phase shift one pump relative to the other by passing them through a few additioned meters of standard fiber. In the FIG. 2 example, the characteristics of the modulation may be varied. The invention may also be applied with pumps of fixed modulation, with no capacity for adjustment of the maximum amplification region.

There is claimed:

1. An optical transmission system comprising a transmission medium having chromatic dispersion, means for emitting into said transmission medium an optical signal to be transmitted, means for emitting into said transmission medium a first pump at a wavelength adapted to pump said optical signal by the Raman effect, and means for emitting into said transmission medium a second pump at a wavelength adapted to pump said first pump by the Raman effect, said means for emitting said pumps being adapted to emit amplitude-modulated first and second pumps with a decorrelation in time between the envelopes of said pumps.

2. The transmission system claimed in claim 1 wherein said means for emitting said pumps are adapted to emit first and second pumps amplitude modulated with the same modulation waveform.

3. The transmission system claimed in claim 1 wherein said means for emitting said pumps are adapted to vary said decorrelation in time between said envelopes of said first and second pumps.

4. The transmission system claimed in claim 1 wherein said means for emitting said pumps are adapted to emit said first and second pumps without said envelopes of said pumps overlapping.

5. The transmission system claimed in claim 1 wherein said means for emitting said optical signal and said means for emitting said pumps are adapted to emit into said transmission medium pumps contrapropagating with respect to said optical signal.

6. A method for the Raman amplification of an optical signal in a dispersive propagation medium, said method comprising the emission into said propagation medium of a first pump at a wavelength adapted to pump said optical signal by the Raman effect and a second pump adapted to pump said first pump by the Raman effect, said first and second pumps being amplitude modulated with a decorrelation in time between the envelopes of said pumps.

7. The method claimed in claim 6 wherein said first and second pumps are amplitude modulated with the same modulation waveform.

8. The method claimed in claim 6 comprising a step of varying said decorrelation in time between said envelopes of said first and second pumps during propagation.

9. The method claimed in claim 6 wherein emission of said pumps is effected in a direction opposite to that of said signals.

* * * * *